United States Patent
Broughton et al.

(10) Patent No.: US 10,488,015 B2
(45) Date of Patent: Nov. 26, 2019

(54) OPTIC FOR PROVIDING BIASED ILLUMINATION

(71) Applicant: Eaton Intelligent Power Limited, Dublin (IE)

(72) Inventors: Kevin Charles Broughton, Sharpsburg, GA (US); Orestes Orbe, Peachtree City, GA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/255,618

(22) Filed: Jan. 23, 2019

(65) Prior Publication Data

US 2019/0154233 A1 May 23, 2019

Related U.S. Application Data

(63) Continuation of application No. 15/660,282, filed on Jul. 26, 2017, now Pat. No. 10,190,747.

(60) Provisional application No. 62/367,004, filed on Jul. 26, 2016.

(51) Int. Cl.
| | |
|---|---|
| *F21V 21/00* | (2006.01) |
| *F21V 5/08* | (2006.01) |
| *F21V 5/04* | (2006.01) |
| *F21V 15/01* | (2006.01) |
| *F21V 7/00* | (2006.01) |
| *G02B 19/00* | (2006.01) |
| *F21W 131/105* | (2006.01) |
| *F21W 131/407* | (2006.01) |
| *F21Y 115/10* | (2016.01) |

(52) U.S. Cl.
CPC .............. *F21V 5/08* (2013.01); *F21V 5/04* (2013.01); *F21V 5/045* (2013.01); *F21V 7/0066* (2013.01); *F21V 7/0091* (2013.01); *F21V 15/01* (2013.01); *G02B 19/0028* (2013.01); *F21W 2131/105* (2013.01); *F21W 2131/407* (2013.01); *F21Y 2115/10* (2016.08)

(58) Field of Classification Search
CPC ............. F21V 5/08; F21V 5/04; F21V 7/0091
USPC ............................ 362/311.02, 308, 309, 310
See application file for complete search history.

(56) References Cited

U.S. PATENT DOCUMENTS

| | | | | |
|---|---|---|---|---|
| 8,956,010 B2 * | 2/2015 | Huang | ................. | F21V 5/007 257/100 |
| 10,190,747 B1 * | 1/2019 | Broughton | ............... | F21V 5/08 |
| 2011/0235338 A1 * | 9/2011 | Chen | ........................ | F21V 5/04 362/311.02 |
| 2012/0287511 A1 * | 11/2012 | Dross | ....................... | F21V 5/04 359/641 |

(Continued)

*Primary Examiner* — Laura K Tso
(74) *Attorney, Agent, or Firm* — King & Spalding LLP

(57) ABSTRACT

An optic configured to create an asymmetric pattern of illumination includes a cavity defined by a sidewall. The cavity is oriented to receive light emitted by a light source that is disposed adjacent a light source receiving end of the cavity. Further, the optic includes a totally internally reflective surface that extends circumferentially about the sidewall and is tapered, so as to reflect emitted light that passes through the sidewall of the cavity and into a body of the optic. The totally internally reflective surface can have a form that is different on opposing sides of the cavity. Furthermore, the optic includes a convex surface that is disposed at a light emitting end of the sidewall to condense, focus, or collimate emitted light from the light source.

17 Claims, 17 Drawing Sheets

(56) References Cited

U.S. PATENT DOCUMENTS

| | | | | |
|---|---|---|---|---|
| 2014/0071693 A1* | 3/2014 | Zhang | ............... | G02B 19/0028 |
| | | | | 362/309 |
| 2014/0112003 A1* | 4/2014 | Lacroix | ................. | F21V 5/04 |
| | | | | 362/329 |
| 2014/0286018 A1* | 9/2014 | Zhang | ............... | G02B 19/0047 |
| | | | | 362/311.02 |
| 2015/0124459 A1* | 5/2015 | Zhang | ............... | G02B 19/0066 |
| | | | | 362/308 |
| 2015/0316226 A1* | 11/2015 | Kumar | ................. | B60Q 1/00 |
| | | | | 362/522 |
| 2016/0153640 A1* | 6/2016 | Iatan | ................ | B29D 11/0048 |
| | | | | 362/311.02 |

\* cited by examiner

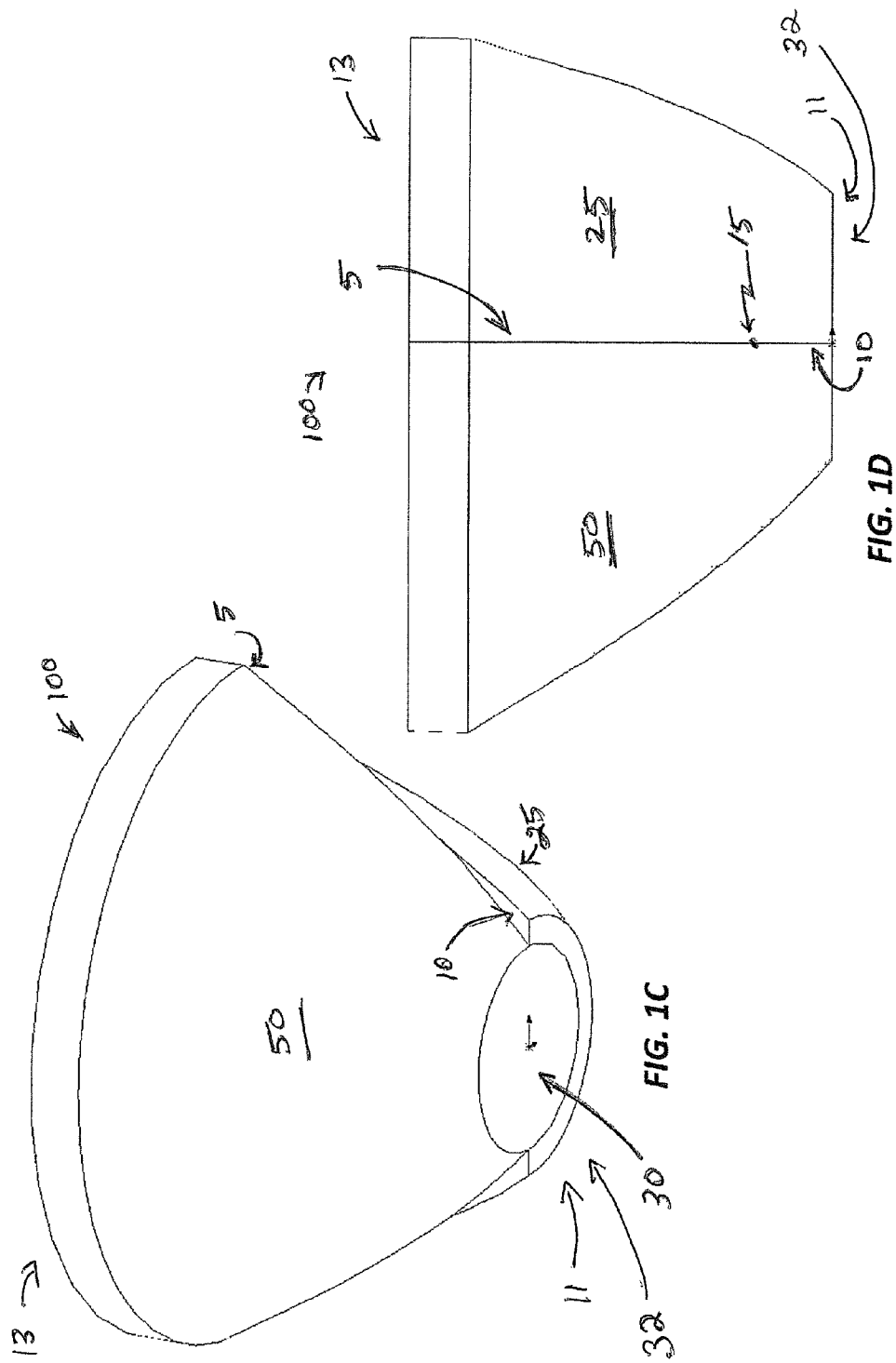

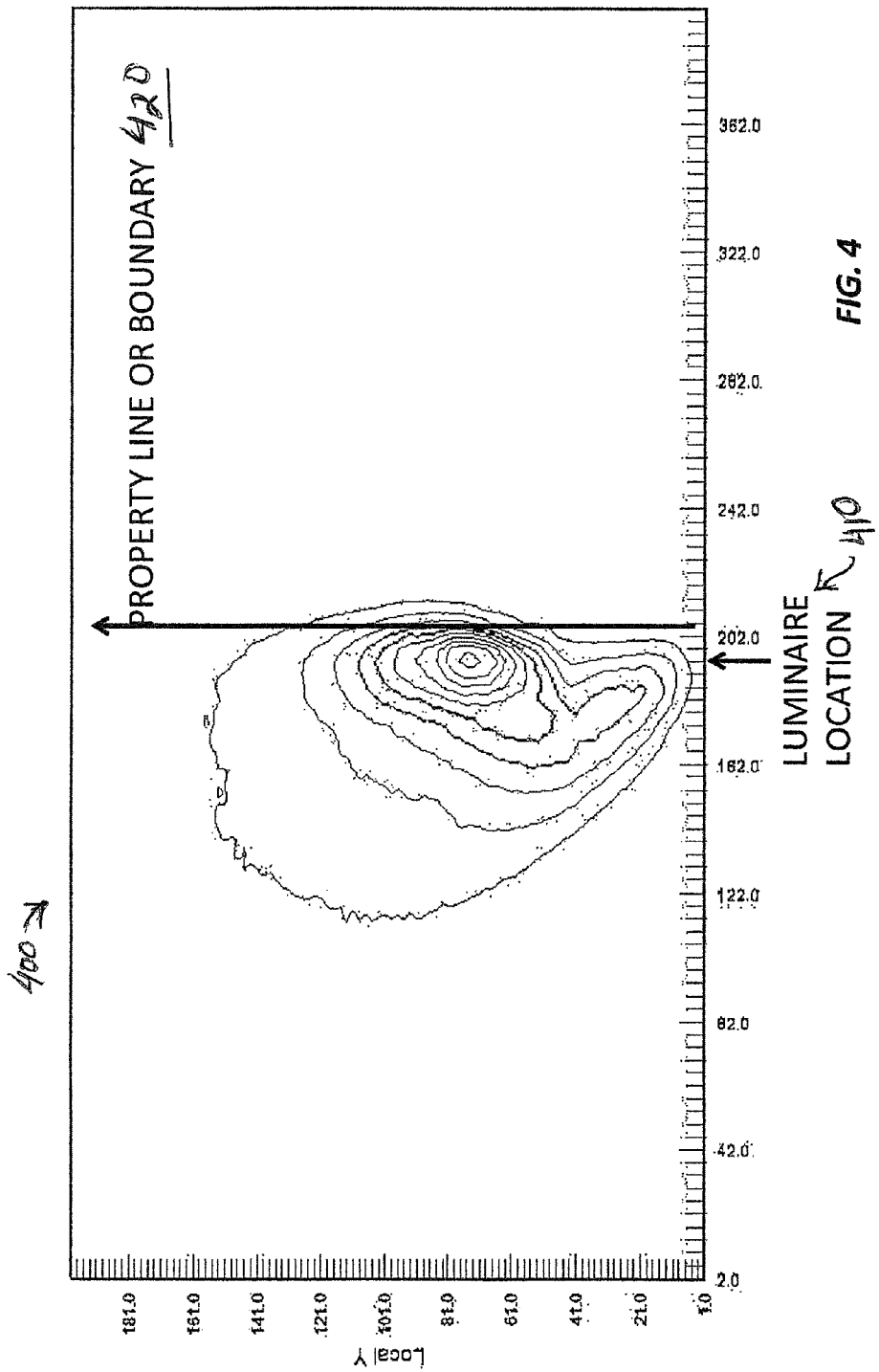

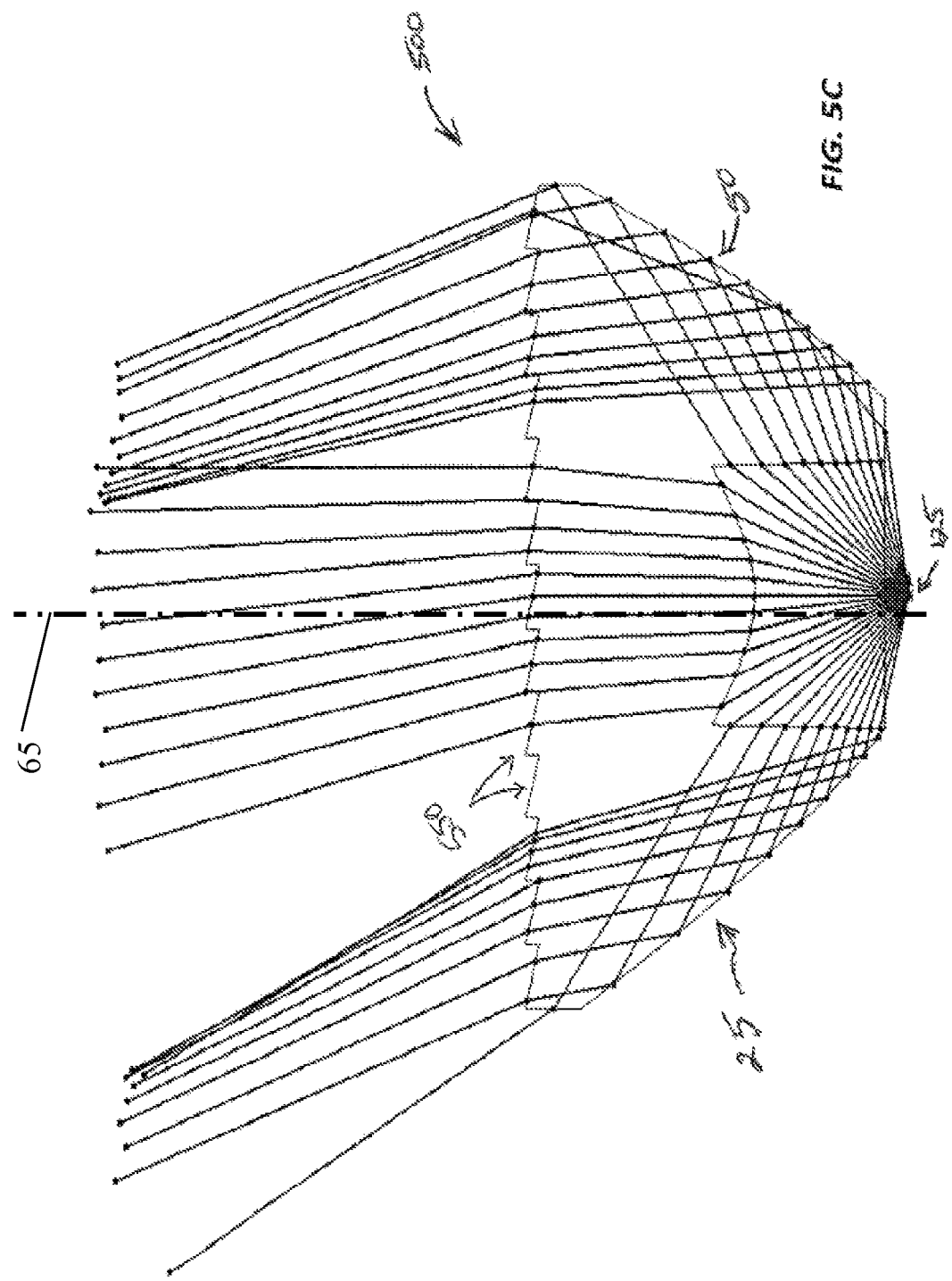

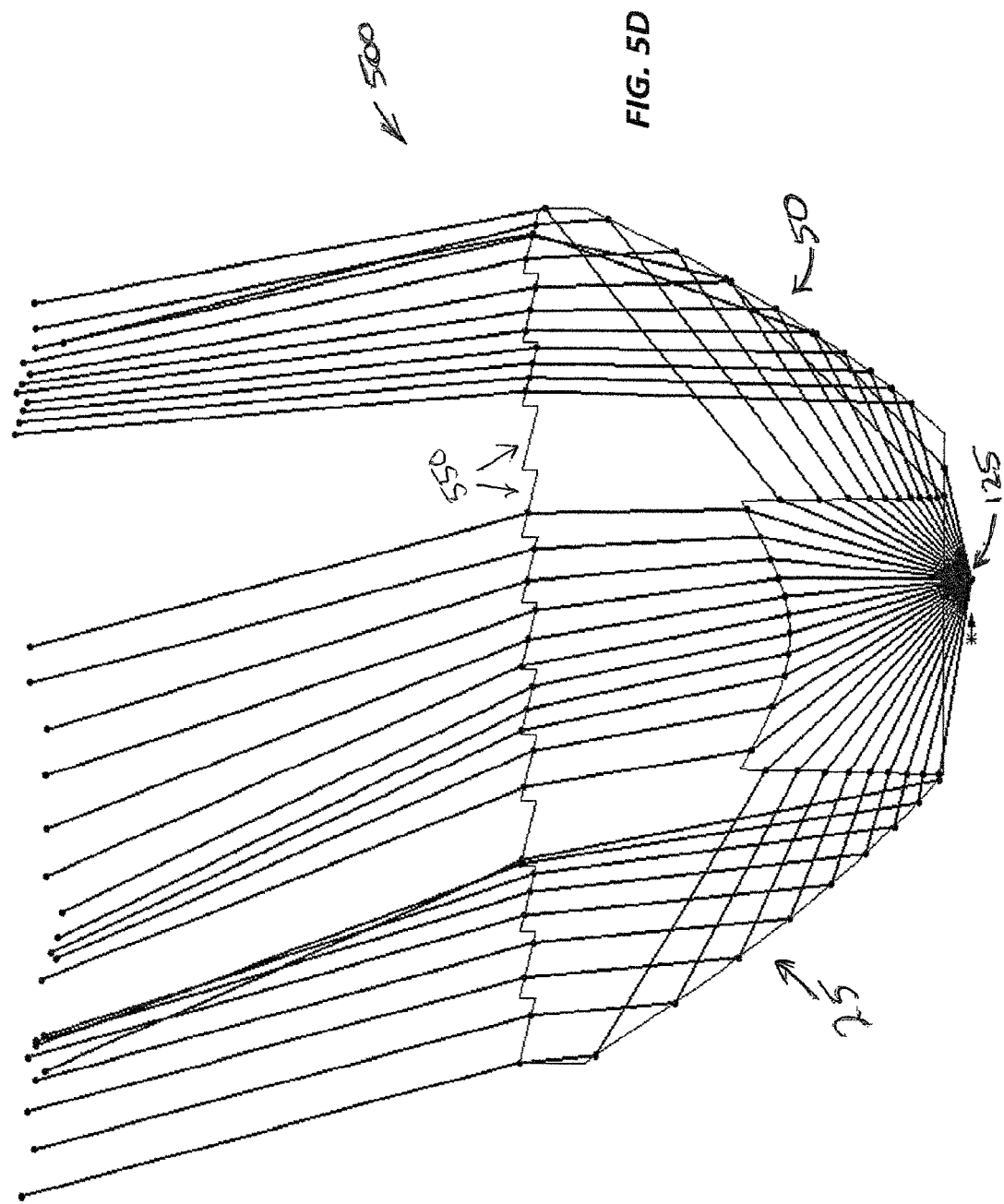

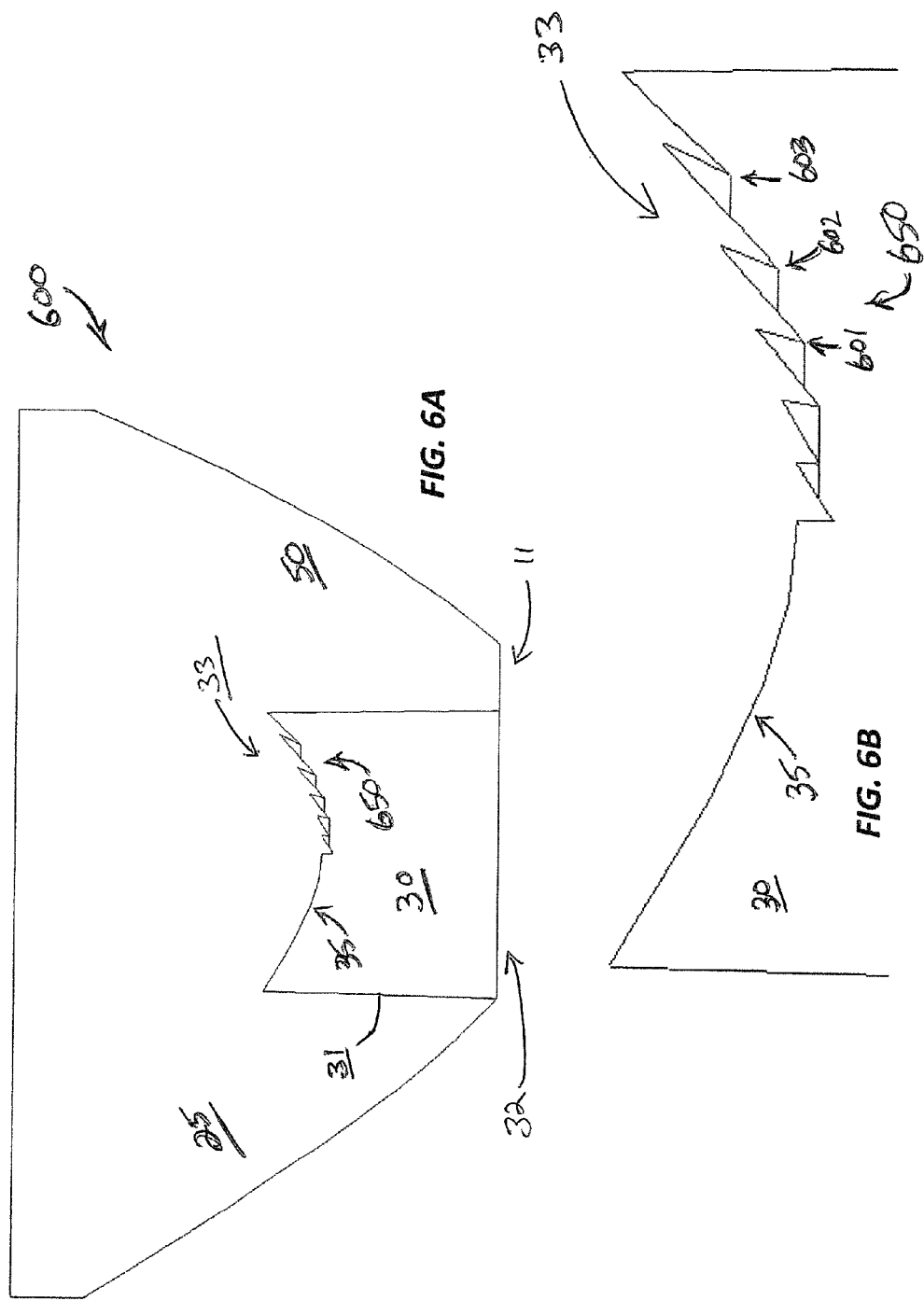

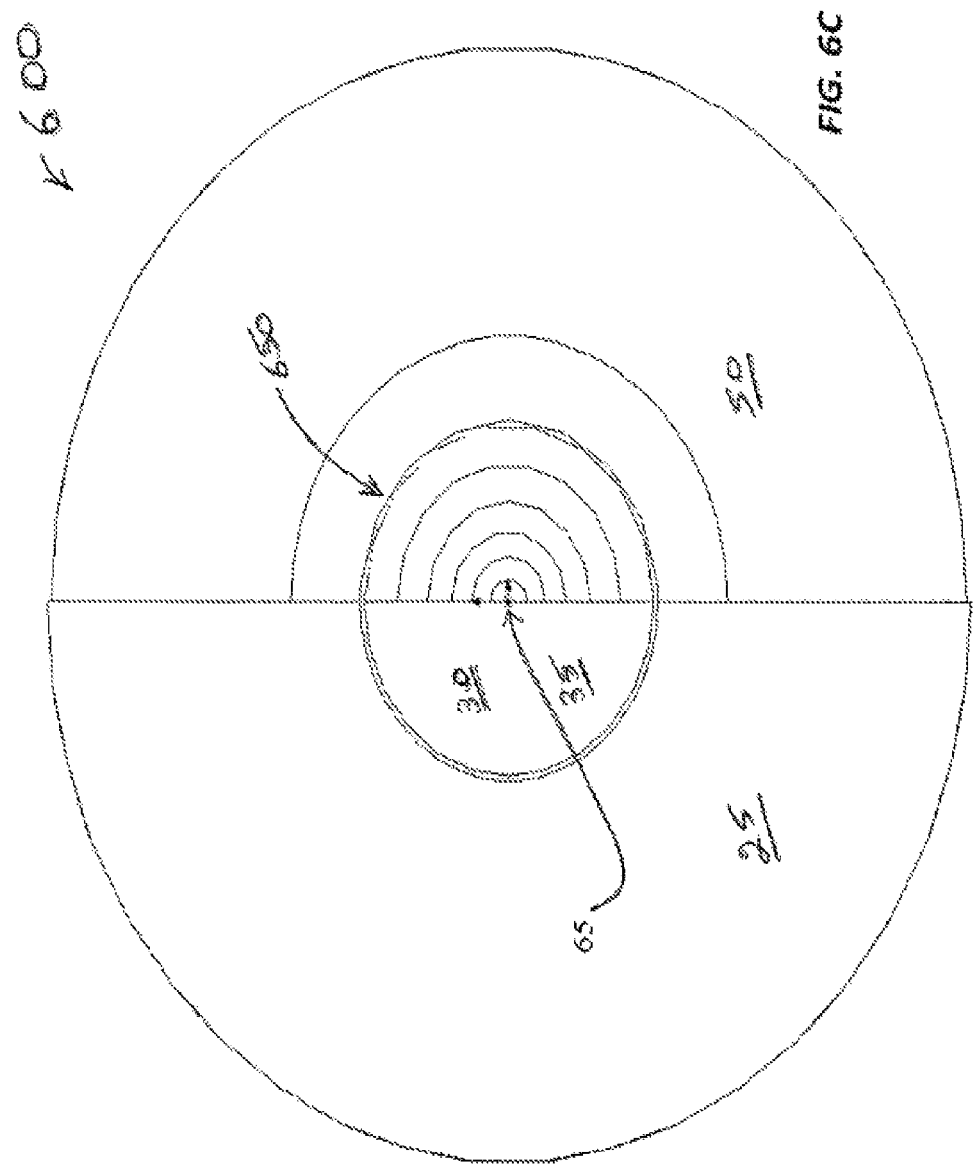

OPTIC FOR PROVIDING BIASED ILLUMINATION

CROSS REFERENCE TO RELATED APPLICATIONS

This application is a continuation application of and claims priority to U.S. patent application Ser. No. 15/660,282 filed Jul. 26, 2017 and titled "Optic for Providing Biased Illumination," which claims priority to U.S. Provisional Patent Application No. 62/367,004 filed Jul. 26, 2016 and titled "Optic for Providing Biased Illumination". The entire contents of the foregoing applications are hereby incorporated herein by reference.

TECHNICAL FIELD

Embodiments of the technology relate generally to illumination systems and more particularly to an optic or lens that receives light from a light emitting diode and manipulates the light to provide an asymmetric illumination pattern.

BACKGROUND

As compared to incandescent and fluorescent light sources, light emitting diodes (LEDs) offer substantial potential benefit associated with their energy efficiency, light quality, and compact size. However, to realize the full potential benefits offered by light emitting diodes, new technologies are needed.

For instance, there are needs in the art for technology to utilize light emitting diodes for illumination. Need exists for optics and light-emitting-diode-based systems that can create asymmetric distributions of illumination. Need exists for an optic or an optical system that can receive light from a light source that has an axis and steer or direct the received light laterally relative to the axis, for example, to prevent light pollution arising from uplight, skyglow, and/or the spilling or trespassing of light outside of an intended area of illumination. A capability addressing one or more such needs, or some other related deficiency in the art, would support improved illumination and more widespread utilization of light emitting diodes in luminaires and lighting applications.

SUMMARY

In one aspect, the present disclosure relates to a system. The system includes an optic comprising a cavity that has an opening, a bottom, and a sidewall that extends between the opening and the bottom and that circumscribes an axis. The cavity is configured to receive light emitted by at least one light emitting diode disposed adjacent the opening. Further, the system includes a convex refractive surface disposed at the bottom of the cavity and configured for condensing a first portion of the received light that transmits in the cavity along the axis. The system also includes a surface that circumscribes the cavity and is configured for totally internally reflecting a second portion of the received light that passes through the sidewall of the cavity. The surface includes a first surface region extending circumferentially partially about the cavity, and a second surface region extending circumferentially partially about the cavity. The first surface region and the second surface region meet one another at two circumferential positions with two discontinuities.

In another aspect, the present disclosure relates to a lens. The lens includes a front, a rear disposed opposite the front, a first surface, and a second surface. Each of the first surface and the second surface extends from the rear to the front while tapering out. At the front, the first surface protrudes relative to the second surface, and at the rear, the second surface protrudes relative to the first surface.

In yet another aspect, the present disclosure relates to an optic. The optic includes a cavity that has an opening, a bottom, and a sidewall that extends between the opening and the bottom. The cavity circumscribes an axis. Further, the cavity is configured to receive light emitted by at least one light emitting diode disposed adjacent the opening. The optic also includes a first surface that circumscribes the cavity and is configured for totally internally reflecting a first portion of the received light that passes through the sidewall of the cavity. Furthermore, the optic includes a second surface that is disposed at the bottom of the cavity and that comprises a pattern of undercut grooves.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein:

FIGS. 1A, 1B, 1C, 1D, 1E, and 1F (collectively FIG. 1) are illustrations of an example optic in accordance with some embodiments of the disclosure;

FIG. 3A is a plot for the optic illustrated in FIG. 1 and FIG. 3B is a plot for a comparative optic;

FIG. 4 is an illustration of an example illuminance contour plot for the optic illustrated in FIG. 1 in accordance with some embodiments of the disclosure;

FIGS. 5A, 5B, 5C, and 5D (collectively FIG. 5) are illustrations of another example optic in accordance with some embodiments of the disclosure;

FIGS. 6A, 6B, 6C, 6D, and 6E (collectively FIG. 6) are illustrations of another example optic in accordance with some embodiments of the disclosure;

FIG. 8A is a plot for a conventional optic that provides a symmetric NEMA2 light distribution and FIG. 8B is a plot for the optic that is used in the example environment illustrated in FIG. 7 which provides an asymmetric NEMA2 light distribution in accordance with some embodiments of the disclosure;

FIG. 10A is a plot for a conventional optic providing symmetric NEMA5 light distribution and FIG. 10B is a plot for the optic that is used in the example environment illustrated in FIG. 9 which provides an asymmetric NEMA5 light distribution in accordance with some embodiments of the disclosure.

Figure 1B:
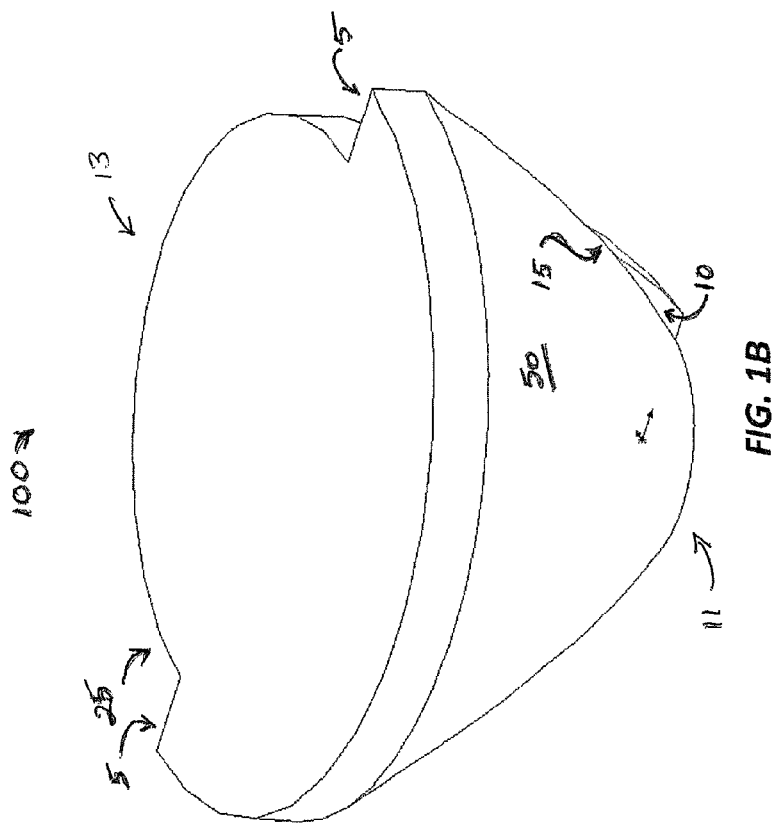

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

A light emitting diode can emit light along an axis. An optic can be positioned to create an asymmetric pattern of illumination from the emitted light. The optic can comprise a cavity that is oriented to receive the light emitted by the light emitting diode. A totally internally reflective surface can extend circumferentially about the cavity and can be tapered, so as to reflect emitted light that passes through the sidewall of the cavity and into the body of the optic. The totally internally reflective surface can have a form that is different on opposing sides of the cavity. A convex surface disposed at the bottom of the cavity can condense, focus, or collimate light.

Some representative embodiments will be described more fully hereinafter with example reference to the accompanying drawings that illustrate embodiments of the technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Turning now to FIGS. 1, 2, 3, and 4, a representative optic 100 will be described in further detail according to some embodiments of the disclosure. FIGS. 1A, 1B, and 1C illustrate three perspective views of the optic 100. FIG. 1D illustrates a side view of the optic 100. FIG. 1E illustrates a cross sectional view of the optic 100 corresponding to the side view of FIG. 1D. FIG. 1F illustrates a view of the optic 100 taken from the front side of the optic 100. FIG. 2A illustrates ray traces for the optic 100 overlaid upon the cross sectional view of FIG. 1E, in which the rays are emitted from a point source that corresponds to a light emitting diode 125 located on the axis 65. FIG. 2B also illustrates ray traces for the optic 100 overlaid upon the cross sectional view of FIG. 1E, but here, the rays are emitted from a point source corresponding to a light emitting diode 125 offset from the axis 65. FIG. 3A illustrates a representative candela distribution plot (computer simulated) for the optic 100 with the light emitting diode 125 emitting light as illustrated in FIG. 2A. FIG. 3B illustrates a representative candela distribution plot (computer simulated) for a comparative, symmetrical optic (not illustrated) coupled with the light emitting diode 125. FIG. 4 illustrates a representative illuminance contour plot (computer simulated) for the optic 100 coupled with the light emitting diode 125 as illustrated in FIG. 2A.

In the illustrated embodiment, the optic 100 comprises a substantially cylindrical sidewall 31 that extends from an open light source receiving end (or opening) 32 to a light emitting end (or bottom) 33, where the light emitting end 33 is opposite to the light source receiving end 32. As will be described in further detail below, the open light source receiving end 32 may be disposed adjacent a rear end 11 of the optic 100. The sidewall 31 defines a cavity 30 and is aligned to a light emitting diode 125. In some example embodiments, the light emitting diode 125 may be disposed within the cavity 30. However, in other example embodiments, the light emitting diode 125 may be disposed outside of and adjacent the open light source receiving end 32 of the cavity 30.

Even though the present disclosure describes the cavity as defined by a cylindrical sidewall 31, one of ordinary skill in the art can understand and appreciate that in other example embodiments, the sidewall can have any other appropriate shape without departing from a broader scope of the present disclosure.

The light emitting diode 125 can comprise a single light emitting diode, for example a chip-on-board light emitting diode or a cluster or array of light emitting diodes. The light emitting diode 125 has an optical axis 75 that is generally aligned with and may be coincident with an axis 65 for the cavity 30 of the optic 100. In operation, the light emitting diode 125 emits light that may be centered on and may travel along and about the axis 75. The axis 65 can be disposed at a diametrical center of the cavity 30 or define rotational symmetry for the cavity 30 or for other features of the optic 100 as illustrated in the various figures and as further discussed below, for example.

In various embodiments, the optic 100 can comprise an optical grade polymer, for example polycarbonate, polymethyl methacrylate ("PMMA"), or clear silicone. In some example embodiments, the optic 100 can be molded or otherwise formed as a unitary body of optical material. As further discussed below, clear silicone can have sufficient deformability to support molding with undercut optical features.

In the illustrated embodiment, the axis 65 intersects a convex surface 35 that is disposed at the light emitting end 33 of the cavity 30 and that refracts incident light and functions as a collimator. The convex surface 35 may be spherical in form in some example embodiments. In the illustrated embodiment, a tangent can be taken at a place on the convex surface 35 where the axis 65 intersects the convex surface 35; and the axis 65 and the tangent can be substantially perpendicular to one another at that location. Thus, an angle of approximately 90 degrees can be formed between the axis 65 and the surface of the contour 35 at the point where the axis 65 passes through the convex surface 35.

While the surface 35 is illustrated as convex, other contours may be utilized for various applications. For example, the surface 35 can be concave or a spline in some embodiments. In some embodiments, the surface 35 can be convex or concave to provide desired convergence or divergence of incident light, to provide control, or to achieve a beam pattern sought for a particular application, for example.

In operation, the light emitting diode 125 emits light into the cavity 30 through the open light source end 32 of the cavity 30. A portion of that light propagates through the cavity 30 to the light emitting end 33 of the cavity 30 and is incident upon the convex surface 35 disposed at the light emitting end 33, while another portion is incident upon the sidewall 31 of the cavity 30.

The portion of light that is incident upon the convex surface 30 is refracted and may be focused, condensed, projected, or collimated as illustrated in FIG. 2. Thus, the convex surface 35 can reduce the divergence of the light that is incident upon the convex surface 35. The resulting light can transmit through the front 13 of the optic 100 as illustrated in FIG. 2.

The portion of light that is incident upon the sidewall 31 of the cavity 30 can transmit through the sidewall 31, into the body 17 of the optic 100 that is defined by the curved totally internally reflecting side surfaces 25, 50 of the optic 100.

As best seen in FIG. 2, the totally internally reflective surfaces 25, 50 are contoured to condense and direct the incident light via reflection and to direct the reflected light through the front 13 of the optic 100. Thus, the totally internally reflective surfaces 25, 50 reduce light divergence via focusing or projecting incident light towards the front 13 of the optic 100. The surfaces 25, 50 can further steer light relative to the axis 65 via internal reflection.

Figure 1A:
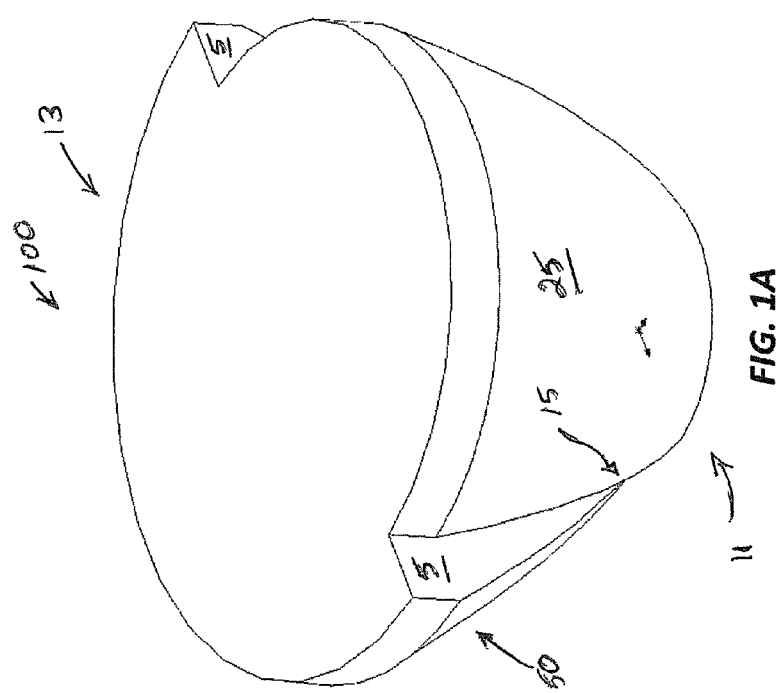
Figure 1E:
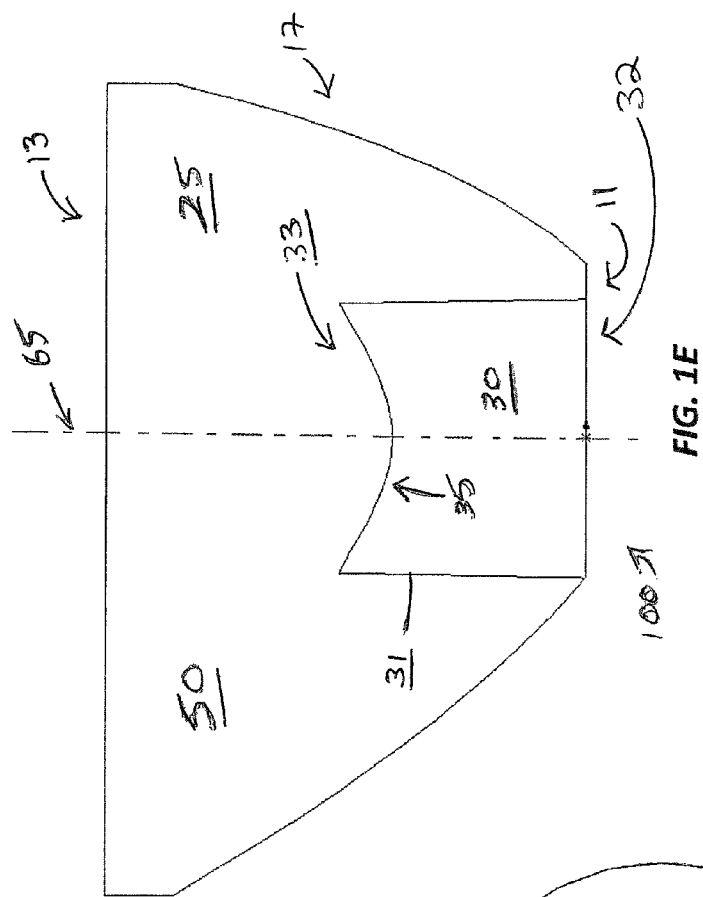
Figure 1F:
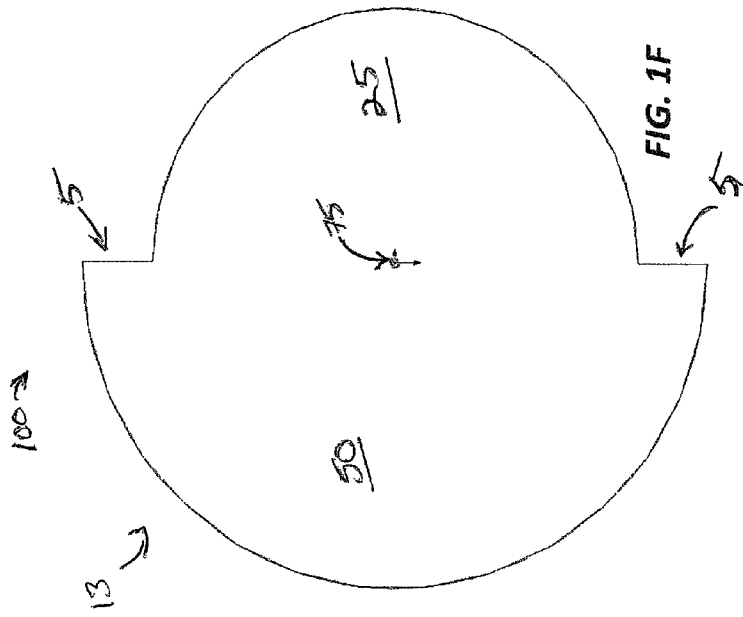

As can be best seen in FIGS. 1A, 1B, and 1F, the illustrated two surfaces 25, 50 have different taper profiles and are totally internally reflective to incident light produced by the light emitting diode 125. Each of the surfaces 25, 50 extends circumferentially partially around the optic 100, and the two surfaces 25, 50 meet in two places with two discontinuities as further discussed below. The surface 50 expands from the rear 11 of the optic 100 to the front 13 of the optic 100 more aggressively and with greater slope than the surface 25. At the rear 11 of the optic 100, the surface 50 has a smaller cross sectional profile (with the cross section taken perpendicular to the axis 65) than the surface 25, while at the front 13 of the optic 100, the surface 25 has the smaller cross sectional profile. In other words, at the rear 11 of the optic 100, the surface 25 has a larger curvature radius from the axis 65 than the surface 50, while at the front 13 of the optic 100, the surface 25 has a smaller curvature radius from the axis 65 than the surface 50. And at a location 15 between the front 13 and the rear 11 of the optic 100, the two surfaces (25, 50) may have substantially equal or similar cross sectional profiles (and same curvature radius.

At the front 13 of the optic 100, the meeting surfaces 25, 50 produce a discontinuity 5 (circumferential discontinuity) where the surface 50 protrudes out relative to the surface 25. Meanwhile, at the rear 11 of the optic 100, the meeting surfaces 25, 50 produce another discontinuity 10 where the surface 25 protrudes out relative to the surface 50. At the location 15, the profiles of the surfaces 25, 50 cross one another, thereby essentially eliminating circumferential discontinuity at that location 15.

Accordingly, the two illustrated totally internally reflective surfaces 25, 50 have different tapering rates as best seen in FIGS. 1A and 1B. The totally internally reflective surface 25 and the totally internally reflective surface 50 each extends circumferentially partially about the cavity 30, so that they collectively circumscribe or fully extend about the cavity 30. In some example embodiments, rotating a curved line part way about the axis 65 can generate the form of the surface 25, while rotating another curved line the remainder of the way about the about the axis 65 can generate the form of the surface 50. In some other embodiments, two lines of differing forms are rotated about two different axes that are laterally offset from one another in order to generate embodiments of the two surfaces 25, 50. Those two lines, which may be viewed as axes of rotation, can be parallel to one another and laterally offset from one another. In some other embodiments, the two lines can be offset from one another and non-parallel. In such a non-parallel configuration, the two lines can intersect one another or may be non-intersecting.

As compared to the totally internally reflective surface 50, the totally internally reflective surface 25 is closer to the axis 65 at the front 13 of the optic 100 but is farther from the axis 65 at the rear 11 of the optic 100. In other words, at the optic rear 11, the radial separation between the surface 50 and the axis 65 is less than the radial separation between the surface 25 and the axis 65. Meanwhile, at the optic front 13, the radial separation between the surface 50 and the axis 65 is greater than the radial separation between the surface 25 and the axis 65.

Figure 2A:
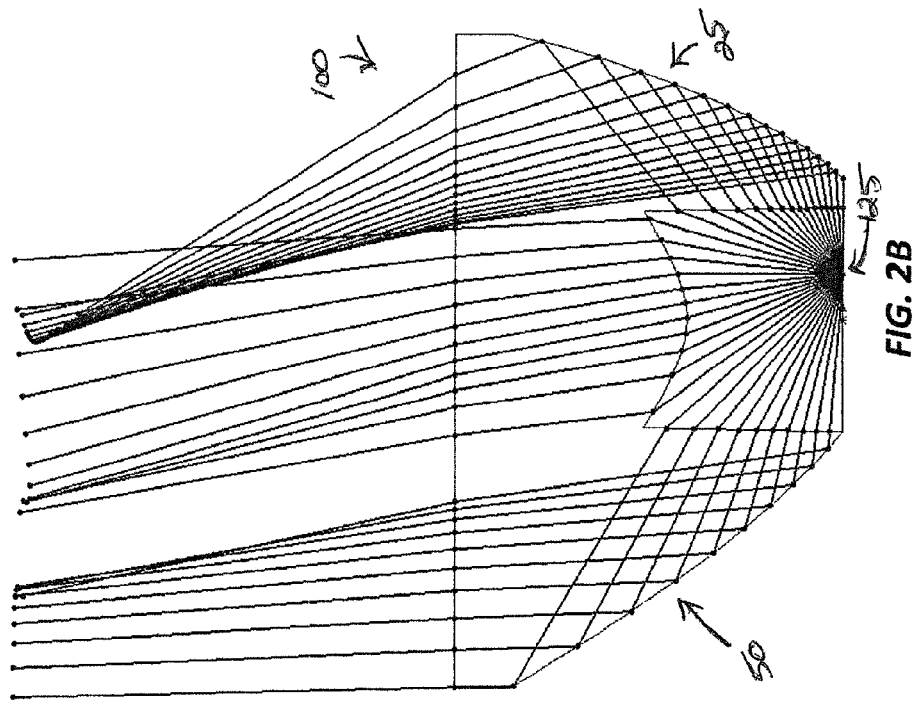
FIGS. 2A and 2B (collectively FIG. 2) are illustrations of example ray traces for the optic illustrated in FIG. 1 in accordance with some embodiments of the disclosure.

The totally internally reflective surfaces 25, 50 meet circumferentially at two locations with a discontinuity 5, 10 or abrupt change in form. As best seen in FIG. 2A, the different contours of the two surfaces 25, 50 produce different patterns of light. The two light patterns can blend together advantageously as illustrated in FIG. 3A and 4 and further discussed below.

In an example embodiment, the internally reflective surface 25 has a contour that is consistent with a NEMA 2 beam, while the internally reflective surface 50 has a contour that is consistent with a NEMA 4 beam. In other words, if the internally reflective surface 25 extended fully about the axis 65 so as to circumscribe the axis, then the resulting optic would produce a NEMA 2 beam. Similarly, if the internally reflective surface 50 extended fully about the axis 65 so as to circumscribe the axis 65, then the resulting optic would produce a NEMA 4 beam.

While in the illustrated example optic 100 the two surfaces 25, 50 circumscribe the optic 100 with each extending approximately 180 degrees circumferentially, other configurations are supported. For example, in some other embodiments, three or more surfaces of differing form collectively circumscribe the optic 100. Three surfaces may each extend one-third of 360 degrees, four surfaces may each extend one-fourth of 360 degrees, and so forth. In some embodiments, multiple surfaces may extend across different arc lengths. For example, in a three-surface embodiment, one surface of one form may extend circumferentially approximately 180 degrees, while the other two surfaces (each having yet a different form) may each extend approximately 90 degrees. As another example, in an optic with two surfaces of differing forms, one surface might extend approximately 260 degrees, while the other surface might extend approximately 100 degrees. In some embodiments, the adjacent surfaces meet in a transition area. In such an embodiment, two surfaces of differing form may gradually change to meet without necessarily having a discontinuity. Each of the embodiment examples described in this paragraph (as well as the various embodiments disclosed in other places in this document) can include a pattern of refractive grooves for further steering light as illustrated in FIGS. 5 and 6 and further discussed below.

Figure 2B:
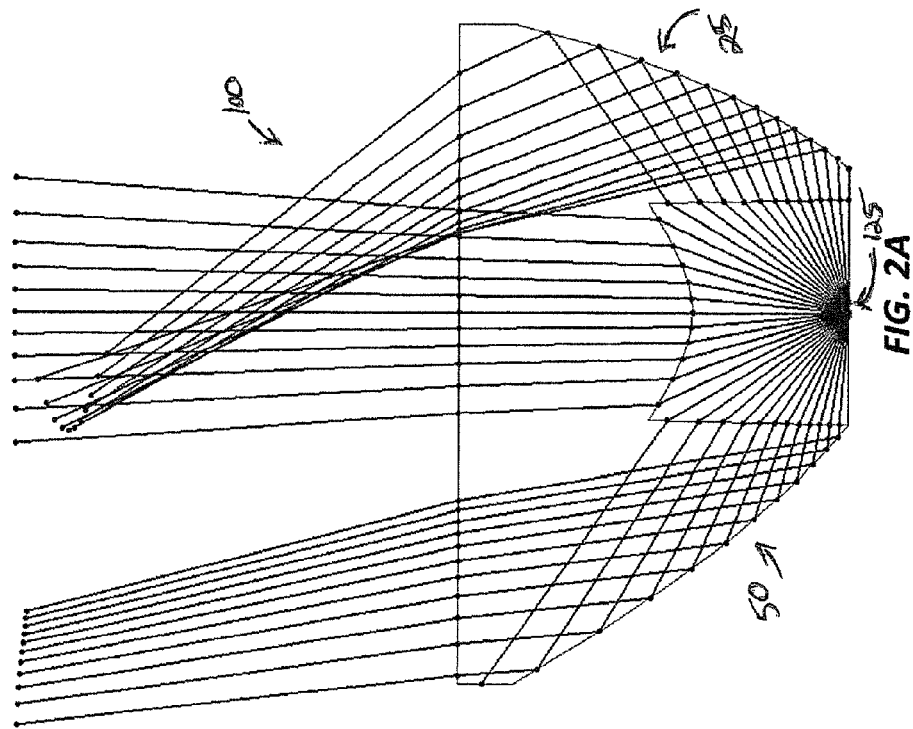

As illustrated in FIG. 2A, the beam that results from the combination of the two internally reflective surfaces 25, 50 has most of the emitted rays oriented to one side of the axis 65 with the light emitting diode 125 centered on the axis 65. As illustrated in FIG. 2B, moving the light emitting diode 125 off axis 65 towards the surface 25 further biases the light to one side of the axis 65.

Figure 3B:
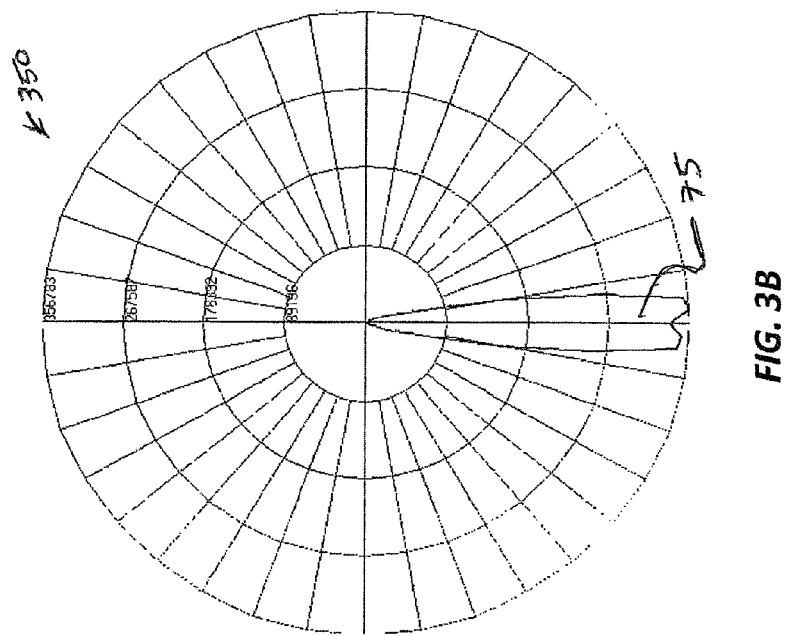
FIGS. 3A and 3B (collectively FIG. 3) are illustrations of example candela distribution plots in accordance with some embodiments of the disclosure, where
Figure 3A:
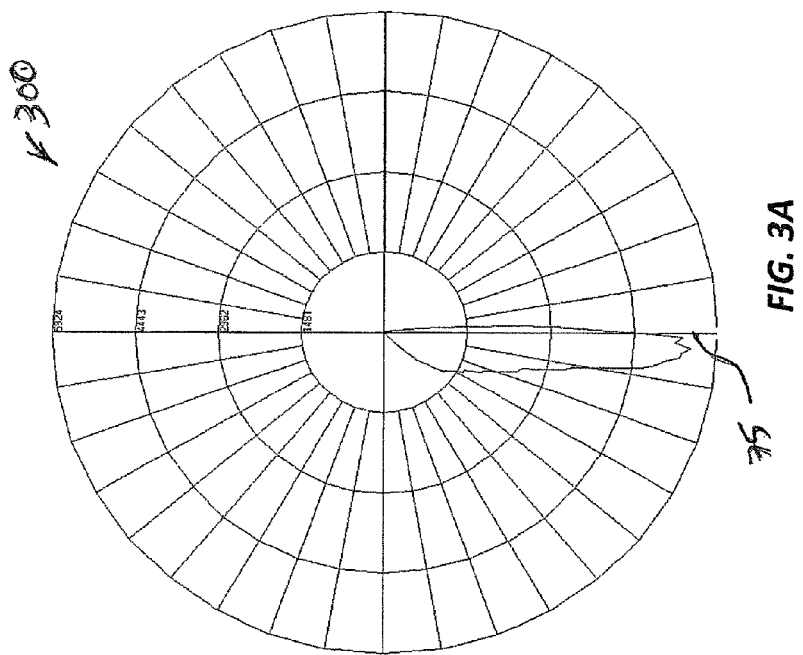

FIG. 3A illustrates a plot 300 of candela distribution for the optic 100 with the light emitting diode 125 positioned on the axis 65 as illustrated in FIG. 2A, while FIG. 3B illustrates a NEMA 2 candela distribution plot 350 for comparative purposes. In contrast to the plot 350, the plot 300 for the optic 100 exhibits minimal "spill" light on the right side of nadir, which in this case is represented by the axis 75. Further, while the peak intensity for the NEMA 2 plot 350 is on nadir, the peak intensity is on the left side of nadir (and left of the axis 75) for the plot 300 of the optic 100. In other words, the optic 100 generates a half beam light distribution that may be advantageous in various environments as will be described below in FIGS. 4, and 7-10.

FIG. 4 illustrates an illumination contour plot 400 for the optic 100 with a light emitting diode 125 positioned on the axis 65 as illustrated in FIG. 2A. Thus, FIG. 4 and FIG. 3A represent a common optical configuration. The plot 400 of FIG. 4 illustrates an example of how the asymmetrical beam properties of the optic 100 are well suited to installing a luminaire at a location 410 near a property line 420 and having the illumination pattern desirably biased away from the property line.

Figure 8B:
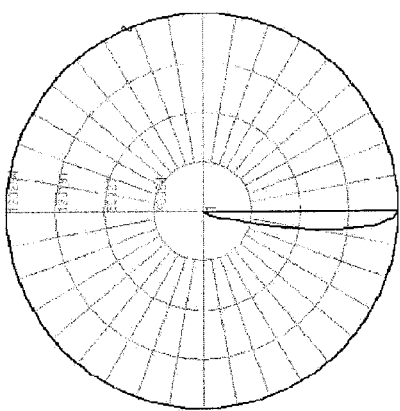
FIGS. 8A and 8B (collectively FIG. 8) are illustrations of example candela distribution plots, where
Figure 8A:
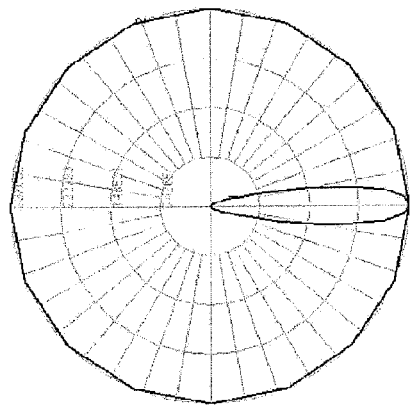
Figure 9:
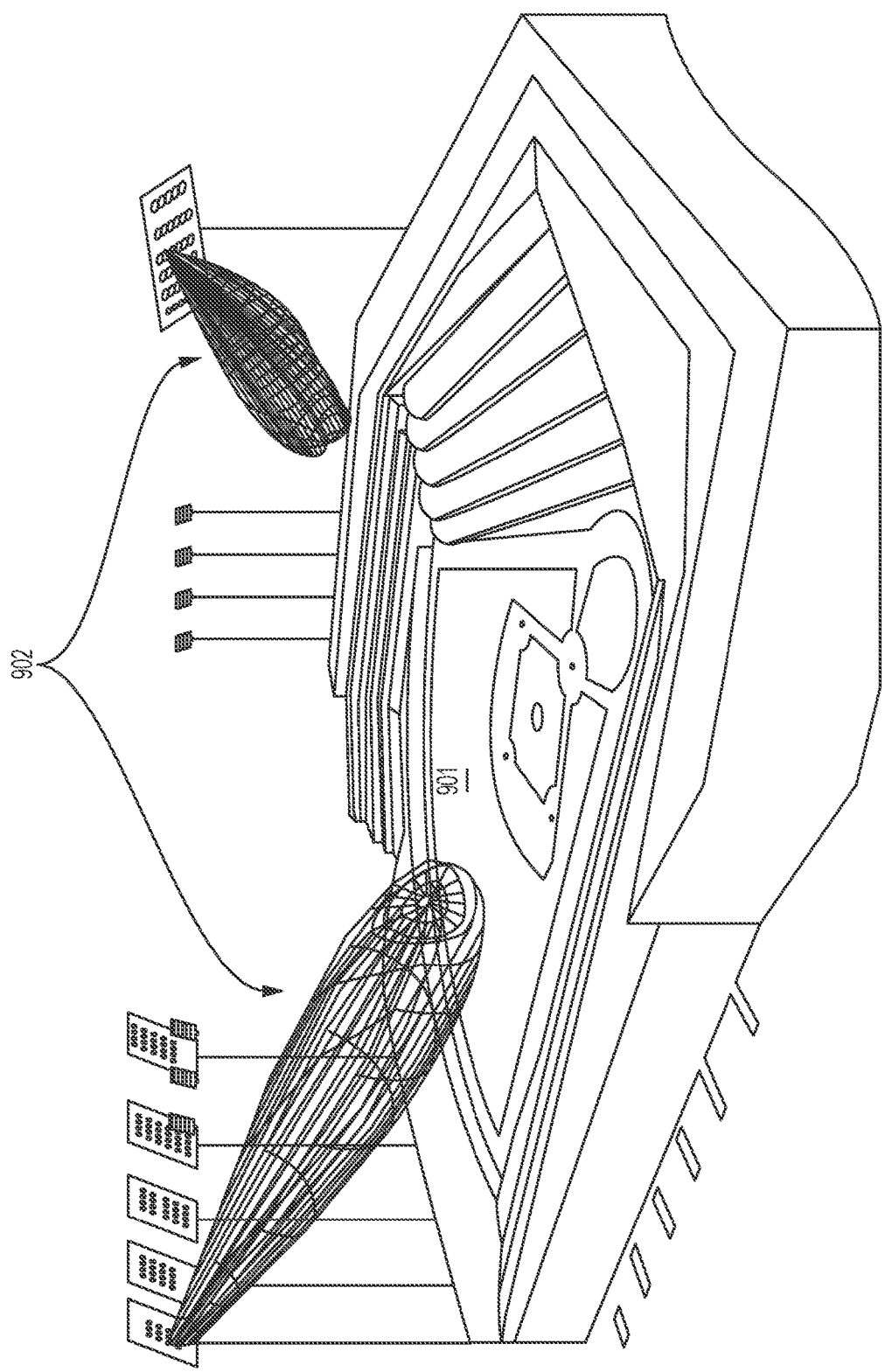
FIG. 9 illustrates an example application of the optic of the present disclosure for providing biased illumination in another example environment in accordance with some embodiments of the disclosure.

Other example environments where the asymmetrical beam properties, e.g., half beam distribution from asymmetric optics (e.g., optic 100 or optic 500 (shown in FIG. 5)) can be used are illustrated in FIGS. 7 and 9. FIG. 7 illustrates the use of asymmetrical beam properties of the light emitted from an asymmetric optic in sports lighting to illuminate a basketball court for basketball games, such as NBA (Nation Basketball Association) games where illuminance requirements are very high and the luminaires are placed far away from the basketball court. In particular, NBA basketball courts have very strict requirements on light that is spilled off the basketball court. In other words, the intention is to only focus light on the player(s) while having minimal illumination on the spectators. FIG. 7 illustrates two different ways in which said requirements of the NBA basketball courts can be achieved by using asymmetric half beam light 702 or 703 from an example asymmetric half beam optic. FIG. 8B is a candela plot of the asymmetric half beam light 702 and/or 703 of FIG. 7, while FIG. 8A illustrates a symmetric light distribution from a conventional optic for comparative purposes. Conventional optics may be able to correct or control the spill light (light that is spilled out beyond a desired area), but would require additional equipment such as shields, visors, etc. The need for this additional equipment is eliminated or can be avoided when asymmetric optics as described herein is used. With asymmetric optics, all the control of the light can be achieved with the optic itself, e.g., by the design of the optic.

Figure 7A:
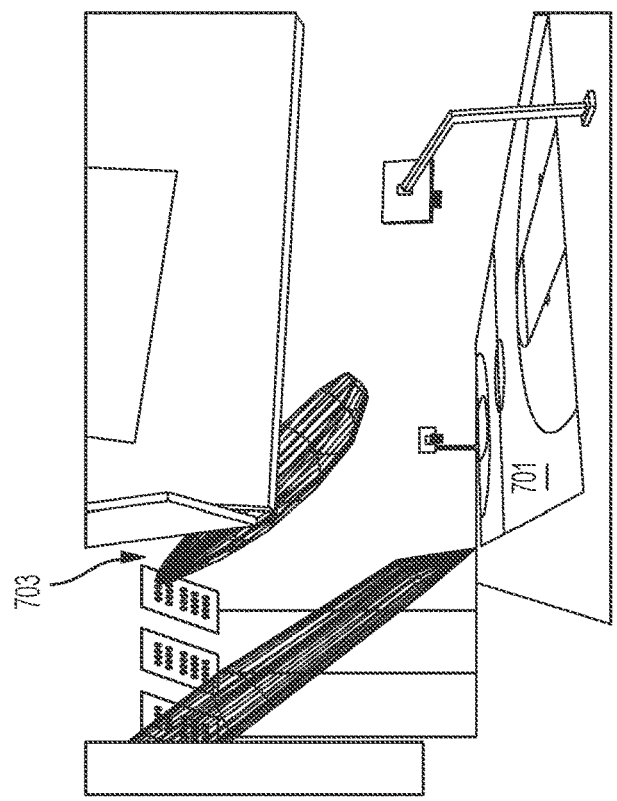
FIGS. 7A and 7B (collectively FIG. 7) illustrate an example application of an optic of the present disclosure for providing biased illumination in an example environment in accordance with some embodiments of the disclosure.
Figure 7B:
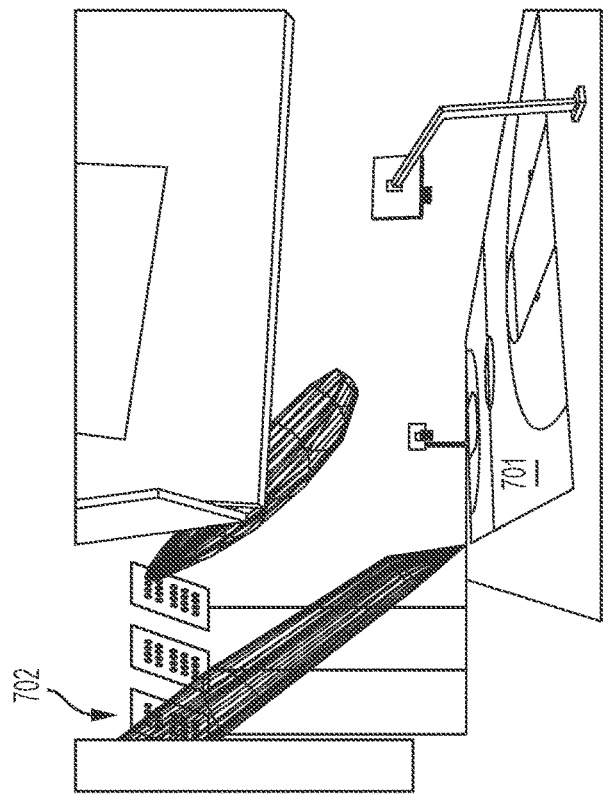

The two ways that the asymmetric half beam light 702 and/or 703 from the asymmetric half beam optic can be used for lighting the NBA basketball court shown in FIGS. 7A and 7B is as follows:

(1) Aiming a light fixture with the asymmetric half beam optic at a boundary line of the basketball court 701 with the beam "cut off" portion of the optic on the bottom of the optic. As a result there is a sharp cut off of the asymmetric half-beam light 702 from the light fixture at the court boundary line and thereby the light spill on the spectators is reduced while all the light is directed to the areas inside the court boundary lines as shown in FIGS. 7A and 7B, and/or (2) Aiming the light fixture with the asymmetric half beam optic across the court such that the beam "cut off" portion of the optic is placed on top of the optic. As a result illumination from the asymmetric half-beam light 703 that falls inside the court boundary lines increases while the uplight that otherwise will hit the TV screens or other areas above the court are reduced as illustrated in FIGS. 7A and 7B.

Figure 10B:
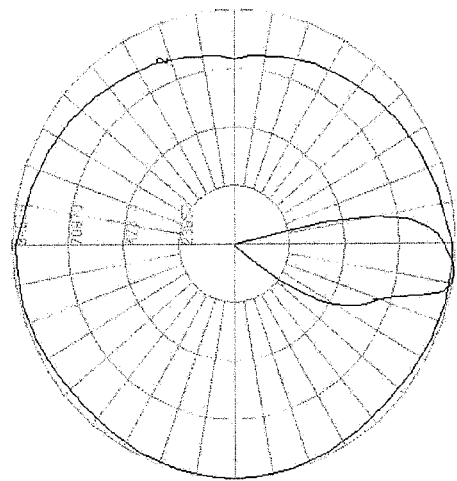
FIGS. 10A and 10B (collectively 'FIG. 10') are illustrations of example candela distribution plots, where
Figure 10A:
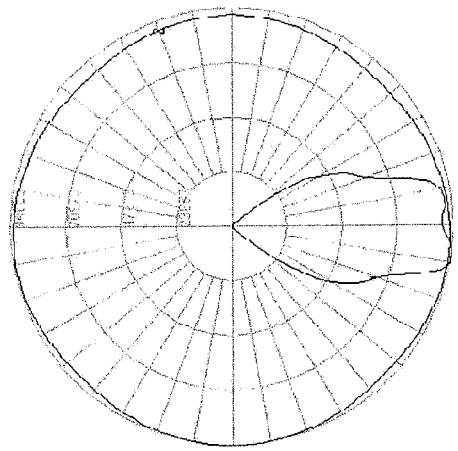

Similarly, the asymmetric half beam light distribution can be applied in other sports lighting applications, such as in baseball fields as illustrated in FIG. 9. FIG. 10B illustrates the candela plot of an asymmetric half beam NEMA5 light 902 generated by an asymmetry on an optic, such as optic 100 or optic 500. FIG. 10A illustrates a symmetric light distribution from a conventional optic for comparative purposes. In particular, the asymmetry on the optic allows for a bottom portion of the optic to behave as a traditional NEMA5 while the top portion offers a sharp cut off, thereby increasing the illuminance levels inside the baseball field 901 while cutting high angle light which reduces the overall glare and sky glow as illustrated in FIG. 9.

The term "cut-off portion" as used herein may generally refer to the portion of the optic (e.g., optic 100 or 500) that creates an asymmetrical bias of the emitted light with respect to the axis 65 as illustrated in FIGS. 2A, 2B, 5C, 5D, and 6D. For example the cut-off portion of the optic 100 may be the surface 25 in FIGS. 2A and 2B or surface 50 in FIGS. 5C, 5D, and 6D.

Figure 5B:
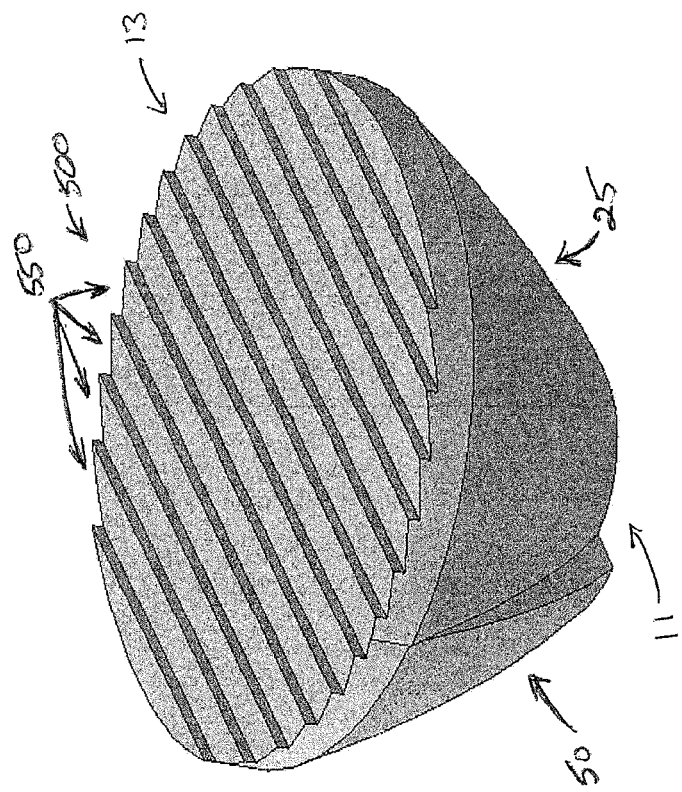
Figure 5A:
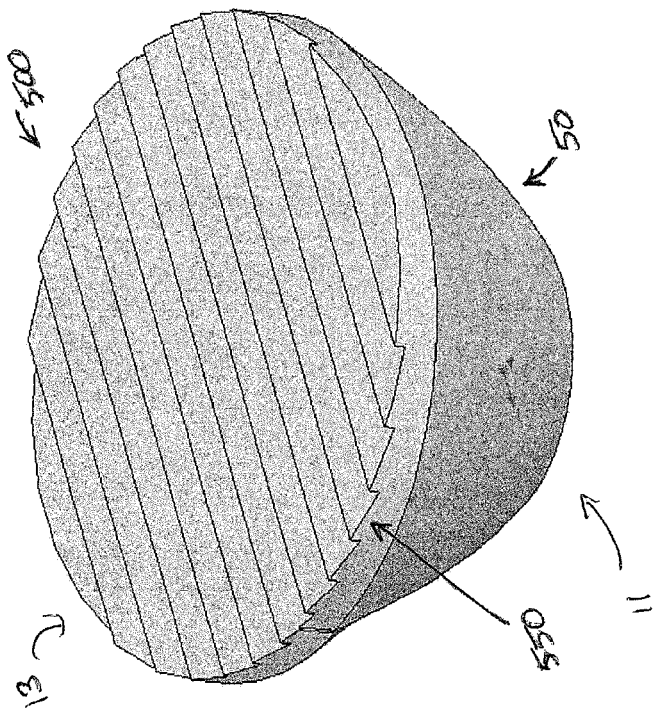

Turning now to FIG. 5, another example optic 500 is illustrated. FIGS. 5A and 5B illustrate two perspective views. FIG. 5C illustrates a cross sectional view of the optic 500 overlaid with representative ray traces and the light emitting diode 125 positioned on the axis 65. FIG. 5D illustrates a cross sectional view of the optic 500 overlaid with representative ray traces and the light emitting diode 125 laterally offset from the axis 65.

The illustrated optic 500 comprises an example pattern of refractive features 550 on the light-emitting front side of the optic 500 that steer light further off of the axis 65 and thus create further illumination bias. In the illustrated embodiment, the refractive features 550 comprise parallel grooves that are each slanted to refract light. Each groove may be viewed as a refractive prism surface, for example.

Figure 6D:
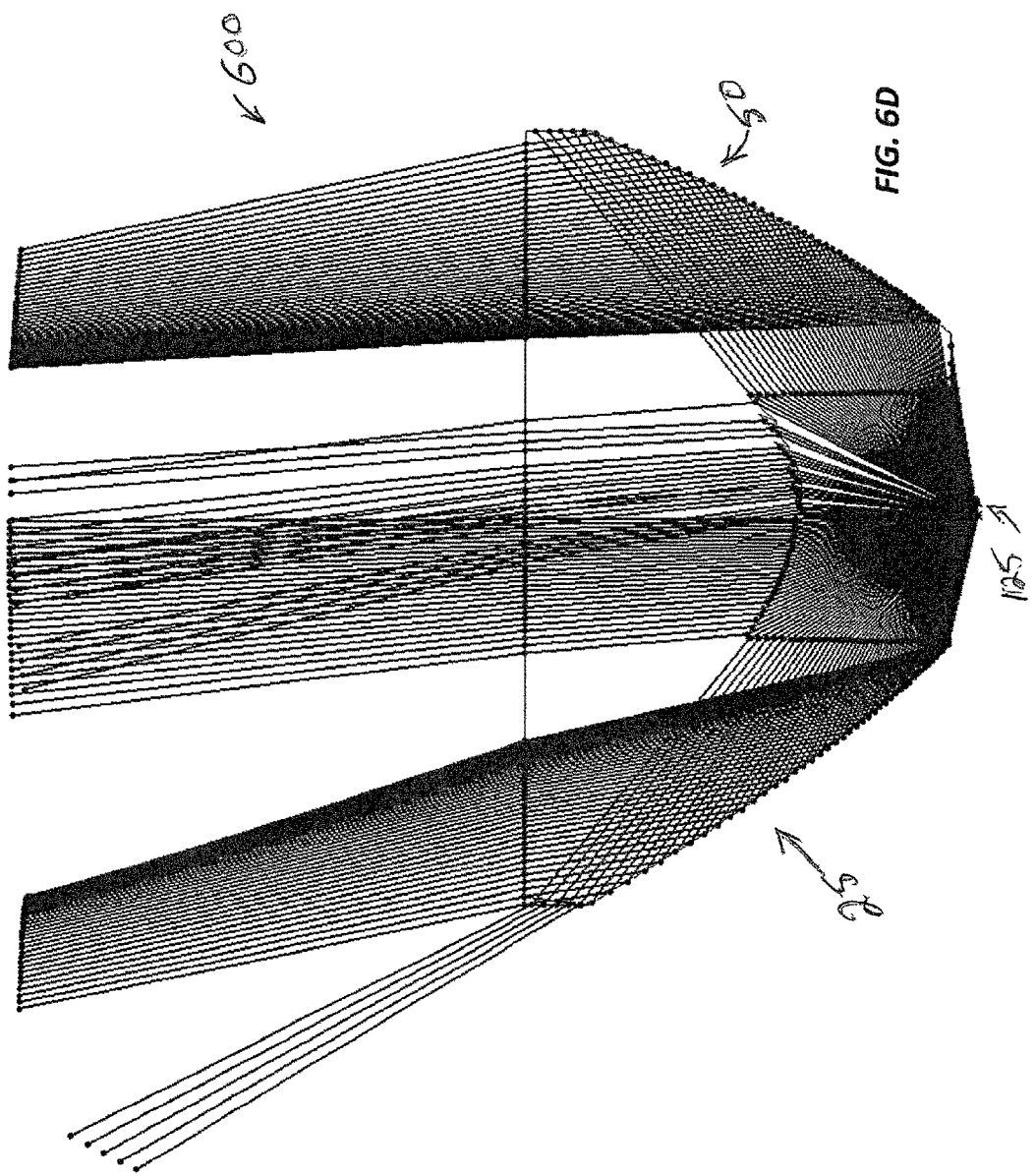
Figure 6E:
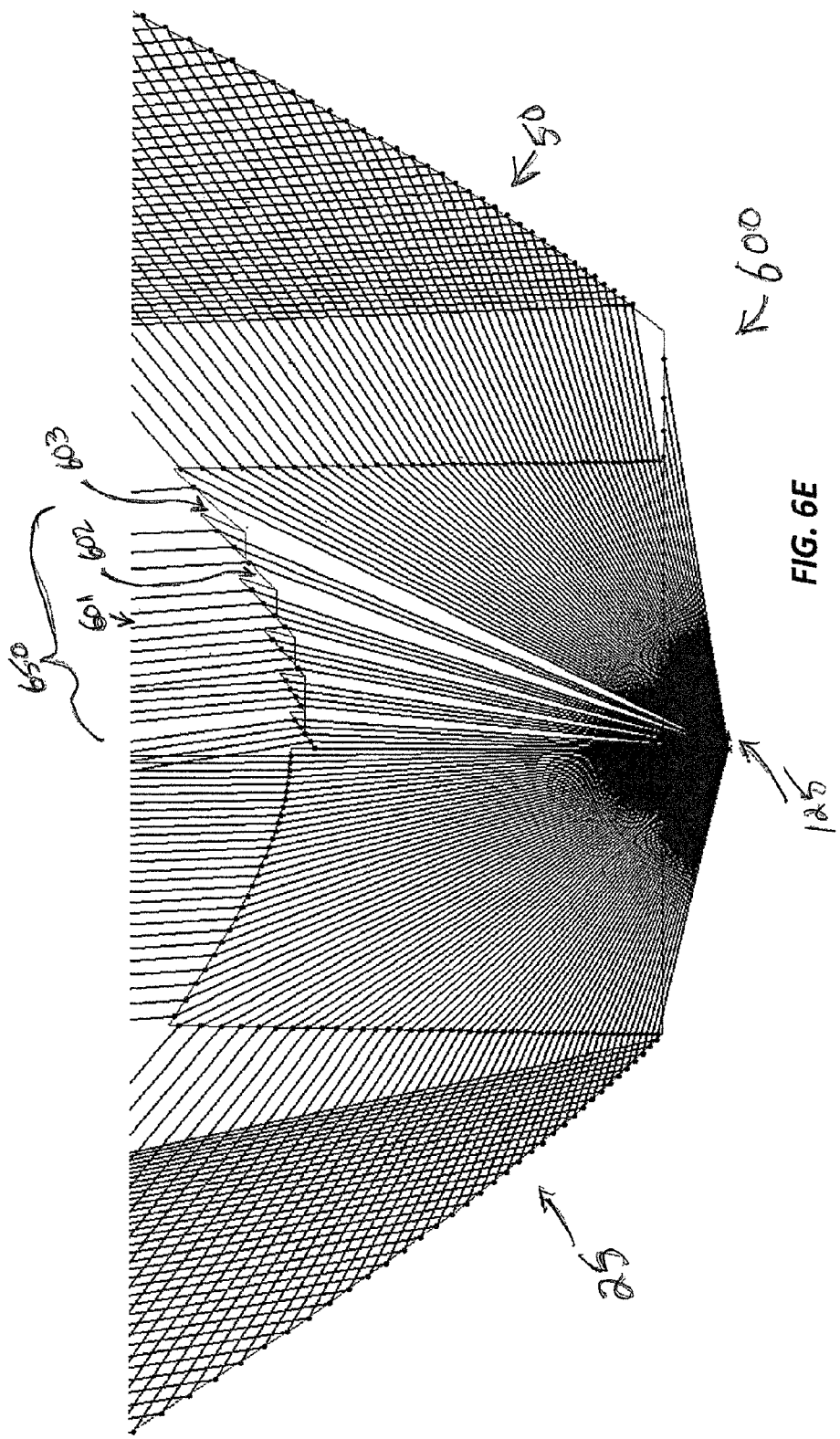

Turning now to FIG. 6, another example optic 600 is illustrated. FIG. 6A illustrates a cross sectional view of the optic 600, while FIG. 6B illustrates a magnified view of a portion of the cross sectional view that details the refractive surface 35. FIG. 6C illustrates a view of the rear, light-receiving side of the optic 600. FIG. 6D reproduces the cross sectional view of the optic 600 as illustrated in FIG. 6A, but overlaid with representative ray traces where the light emitting diode 125 is positioned on the axis 65. FIG. 6E provides a magnified view of a rear portion of the illustration shown in FIG. 6D.

The example optic 600 illustrated in FIG. 6 comprises a pattern of curved grooves 650 on the refractive surface 35 that is disposed at the bottom of the cavity 30. The grooves 650 function to refract and condense or collimate incident light and thus can increase the optical power in a particular area of the convex refractive surface 35. In the illustrated embodiment, the grooves 650 are concentric and are located on one side of the convex refractive surface 35. As illustrated, the grooves 650 can be viewed as comprising one side of a Fresnel lens. In the illustrated embodiment, the grooves 650 extend approximately 180 degrees around the axis 65. In other embodiments, the grooves 650 may extend greater or lesser arc lengths. In some embodiments, multiple forms of the grooves 650 are disposed on the surface 35 and may extend different circumferential arc lengths, for example.

As illustrated and as best seen in FIG. 6B, the grooves 650 are undercut. When the optic 600 is fabricated by molding a pliable optical material, such as optical silicone, the undercut features of the grooves 650 can deform temporarily to facilitate extraction from the mold. Once the finished optic 600 is removed from the mold, the elasticity of the material provides for the features to return to the intended forms, as provided by the mold.

As best seen in the ray traces of FIG. 6E, the undercut produces a useful optical property. For a point source (representing the light emitting diode 125) located on the axis 65, the rays emitted from that point are limited to incidence upon the outward-facing surface of each undercut tooth 601, 602, 603 of the grooves 650. For the cross sectional view of FIG. 6E, if a ray is oriented immediately to the left of the point of a particular tooth 602, then the ray enters the optic 650 through the outward facing surface of the adjacent tooth 601 that is on the left of the tooth 602 and thus avoids incidence upon the under cut surface of the tooth 602. And if a ray is oriented immediately to the right of the point of a particular tooth 602, then the ray enters the optic 650 through the outward facing surface of the tooth 602 and thus avoids incidence upon the undercut surface of the adjacent tooth 603 that is right of the tooth 602.

Even though the present disclosure describes example end applications of the optics described herein (e.g., optics 100 and/or 500) as including sports lighting, boundary lighting, etc., one of ordinary skill in the art can understand and appreciate that the optics described herein can be used in any other appropriate application that requires asymmetric light distribution to avoid spill light and/or other appropriate light pollution conditions without departing from a broader scope of the present disclosure.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system comprising:
    an optic comprising:
        a front and a rear;
        a cavity that comprises:
            an opening disposed at the rear;
            a bottom surface configured to receive a first portion of light from a light emitting diode; and
            a sidewall that extends between the opening and the bottom surface and that circumscribes an axis passing through the optic; and
        a surface that circumscribes the cavity and is configured for totally internally reflecting a second portion of light, from the light emitting diode, that passes through the sidewall of the cavity, the surface comprising:
            a first surface region extending circumferentially partially about the cavity, extending between the front and the rear, and having a first cross-sectional profile perpendicular to the axis; and
            a second surface region extending circumferentially partially about the cavity, extending between the front and the rear, and having a second cross-sectional profile perpendicular to the axis,
            wherein the front is positioned for emitting the first portion of light and the second portion of light,
            wherein at the rear of the optic, the first cross-sectional profile is larger than the second cross-sectional profile,
            wherein at the front of the optic, the first cross-sectional profile is smaller than the second cross-sectional profile, and
            wherein at some lateral position between the front and the rear, the first surface region and the second surface region comprise common displacements from the axis.

2. The system of claim 1, wherein the surface comprises two abrupt changes in form at two circumferential locations.

3. The system of claim 1, wherein the first surface region and the second surface region taper along the axis at different rates.

4. The system of claim 1, wherein the first surface region comprises a first form producible by rotating a first curved line partway about the axis, and
    wherein the second surface region comprises a second form producible by rotating a second curved line partway about the axis.

5. The system of claim 1, wherein the surface comprises:
    a first area where the first surface region is a first radial distance from the axis and the second surface region is a second radial distance from the axis, the first radial distance greater than the second radial distance; and
    a second area where the first surface region is a third radial distance from the axis and the second surface region is a fourth radial distance from the axis, the fourth radial distance greater than the third radial distance.

6. The system of claim 5, wherein for at least one location between the first area and the second area, the first surface region and the second surface regions have equal radial distances from the axis.

7. The system of claim 1, further comprising the at least one light emitting diode disposed adjacent the opening,
    wherein the at least one light emitting diode is offset laterally relative to the axis, and
    wherein the optic comprises a collimating optic.

8. A lens comprising:
    a front comprising grooves that are operative to refract light passing out of the lens through the front;
    a rear disposed opposite the front;
    an axis passing through the front and the rear;
    a first surface region extending circumferentially partially about the axis, extending between the front and the rear, and having a first cross-sectional profile perpendicular to the axis; and
    a second surface region extending circumferentially partially about the axis, extending between the front and the rear, and having a second cross-sectional profile perpendicular to the axis,
    wherein at the rear of the lens, the first cross-sectional profile is larger than the second cross-sectional profile, and
    wherein at the front of the lens, the first cross-sectional profile is smaller than the second cross-sectional profile.

9. The lens of claim 8, wherein the lens further comprises:
    a cavity that extends from the rear towards the front; and
    a concave refractive surface disposed in the cavity.

10. The lens of claim 8, wherein the lens further comprises:
    a cavity that extends from an opening that is disposed at the rear to a bottom that is disposed towards the front relative to the opening; and
    a surface that is disposed at the bottom of the cavity and that comprises a pattern of grooves for refracting incident light passing into the lens via the surface.

11. The lens of claim 10, wherein the pattern of grooves comprises at least a portion of a Fresnel lens.

12. The lens of claim 10, wherein the pattern of grooves comprises undercut features.

13. The lens of claim 10, wherein the pattern of grooves comprises grooves that curve along side one another.

14. An optic comprising:
   a cavity that comprises:
      an opening;
      a bottom; and
      a sidewall that extends between the opening and the bottom and that circumscribes an axis, the cavity configured to receive light emitted by at least one light emitting diode;
   a first surface that circumscribes the cavity and is configured for totally internally reflecting a first portion of the light that is received in the cavity and that passes through the sidewall of the cavity;
   a second surface that is disposed at the bottom of the cavity and that comprises a pattern of grooves,
   a front; and
   a rear disposed opposite to the front and comprising the opening,
   wherein the first surface comprises:
      a third surface region extending circumferentially partially about the cavity and between the front and the rear,
      a fourth surface region extending circumferentially partially about the cavity and between the front and the rear,
      wherein compared to the third surface region, the fourth surface region is radially closer to the axis at the rear of the optic, and
      wherein compared to the fourth surface region, the third surface region is radially closer to the axis at the front of the optic.

15. The optic of claim 14, wherein the pattern of grooves is formed on a convex surface that the second surface comprises.

16. The optic of claim 14, wherein the pattern of grooves comprises at least a section of a Fresnel lens.

17. The optic of claim 14, wherein the pattern of grooves extends partially about the axis without circumscribing the axis.

* * * * *